(12) United States Patent
Takashi (10) Patent No.: US 10,589,610 B2
(45) Date of Patent: Mar. 17, 2020

(54) VEHICLE EXTERIOR STRUCTURE

(71) Applicant: TOYOTA JIDOSHA KABUSHIKI KAISHA, Toyota-shi, Aichi-ken (JP)

(72) Inventor: Toshinobu Takashi, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 89 days.

(21) Appl. No.: 16/035,001

(22) Filed: Jul. 13, 2018

(65) Prior Publication Data
US 2019/0023112 A1 Jan. 24, 2019

(30) Foreign Application Priority Data

Jul. 18, 2017 (JP) ................................ 2017-139193

(51) Int. Cl.
| | | |
|---|---|---|
| *B60J 10/50* | (2016.01) | |
| *B60J 10/265* | (2016.01) | |
| *B60J 10/70* | (2016.01) | |
| *B60R 13/04* | (2006.01) | |

(52) U.S. Cl.
CPC ............. *B60J 10/50* (2016.02); *B60J 10/265* (2016.02); *B60J 10/70* (2016.02); *B60R 13/04* (2013.01)

(58) Field of Classification Search
CPC .......... B60J 10/50; B60J 10/265; B60J 10/70; B60R 13/04

USPC .............. 296/1.08, 210, 76, 146.8, 84.1, 93
See application file for complete search history.

(56) References Cited

U.S. PATENT DOCUMENTS

| | | | | |
|---|---|---|---|---|
| 4,436,336 A | * | 3/1984 | Shimizu | ................... B60J 10/80 296/76 |
| 7,618,084 B2 | * | 11/2009 | Kimura | .................... B60J 5/101 296/146.11 |
| 2010/0032974 A1 | * | 2/2010 | Murray | ............... B60R 13/0206 296/1.08 |

FOREIGN PATENT DOCUMENTS

JP 2004-136792 A 5/2004

\* cited by examiner

*Primary Examiner* — Joseph D. Pape
(74) *Attorney, Agent, or Firm* — Oliff PLC (57) ABSTRACT

A vehicle exterior structure includes a roof panel, a panel rear window glass, a glass side-edge molding disposed along a side edge of the rear window glass, and a garnish having a constant cross section extending in a direction in which the roof panel and the rear window glass are lined. The garnish is disposed to face a side surface of the roof panel and a side surface of the glass side-edge molding. The side surface of the glass side-edge molding is a wall surface which faces the garnish. The garnish is characterized by having an inner lip which faces the side surface of the roof panel and the wall surface. In this way, a vehicle exterior structure with improved appearance and suppressed noise can be provided.

8 Claims, 8 Drawing Sheets

VEHICLE EXTERIOR STRUCTURE

CROSS REFERENCE TO RELATED APPLICATION

The disclosure of Japanese Patent Application No. 2017-139193 filed on Jul. 18, 2017 including the specification, claims, drawings, and abstract is incorporated herein by reference in its entirety.

TECHNICAL FIELD

The present disclosure relates to a vehicle exterior structure, in particular, to an exterior structure including an exterior body panel, a window glass, a glass molding, and a garnish.

BACKGROUND

A vehicle molding in which two types of moldings with differently shaped lips are welded has been disclosed for a vehicle structure including a roof panel and a window glass coupled to each other in a vehicle longitudinal direction. The lips have different cross sections at a joint to a side surface of the roof panel and at a joint to a side surface of the window glass (for example, JP 2004-136792 A).

SUMMARY

The vehicle molding disclosed in JP 2004-136792 A is unattractive in appearance because of visible welding lines at the joints to the roof panel and to the window glass. Further, because of the different lip shapes at the joints to the roof panel and to the window glass, airflow disturbances along the lips may occur, causing noise during driving.

An object of the present disclosure is to provide a vehicle exterior structure which achieves improved appearance and suppressed noise.

Solution to Problem

A vehicle exterior structure according to one aspect of the present disclosure includes an exterior body panel, a plate window glass disposed next to the exterior body panel, a glass side-edge molding disposed along a side edge of the window glass up to the exterior body panel in a direction in which the exterior body panel and the window glass are lined, and a garnish disposed to face a side surface of the exterior body panel and a side surface of the glass side-edge molding. The garnish has a constant cross section running in the direction in which the exterior body panel and the window glass are lined. The side surface of the glass side-edge molding is a wall surface which faces the garnish. The garnish includes a lip in contact with the side surface of the exterior body panel and the wall surface of the glass side-edge molding.

As described above, the side surface of the glass side-edge molding is a wall surface, and the lip of the garnish has a constant cross section running in the direction in which the exterior body panel and the window glass are lined such that the lip is in contact with the side surface of the exterior body panel and the wall surface of the glass side-edge molding. Consequently, it becomes possible to achieve an improved appearance because of no joint boundary in the garnish, and to suppress noise because of no disturbance in air flow along the lip of the garnish.

In a vehicle exterior structure according to another aspect of the present disclosure, an end surface of the wall surface of the glass side-edge molding in the direction in which the exterior body panel and the window glass are lined may be in contact with a surface of the exterior body panel which faces the window glass. The wall surface may be on the same plane as the side surface of the exterior body panel.

In this way, the side surface of the exterior body panel and the wall surface of the glass side-edge molding, both of which are in contact with the lip of the garnish, can be smoothly connected without a step or space. Consequently, because no disturbance occurs in the air flow along the lip of the garnish, noise can be suppressed.

A vehicle exterior structure according to still another aspect of the present disclosure may further include a glass upper-edge molding which is disposed along a window glass upper edge which faces the exterior body panel. The glass upper-edge molding may extend in a direction intersecting with the direction in which the exterior body panel and the window glass are lined. The glass upper-edge molding may include an upper-edge lip which abuts the facing surface of the exterior body panel. An end portion of the glass upper-edge molding may be welded with an end portion of the glass side-edge molding.

As described above, the joint between the exterior body panel and the upper edge of the window glass is sealed by disposing, along the upper edge of the window glass, the glass upper-edge molding which includes the upper-edge lip. The joint between the garnish and the glass side-edge molding is also sealed by disposing, along the side edge of the window glass, the glass side-edge molding including the wall surface with which the lip of the garnish is in contact. Further, the end portion of the glass upper-edge molding and the end portion of the glass side-edge molding is welded. Consequently, it becomes possible to preferably seal around the window glass while avoiding overlap of the lip of the glass molding and the lip of the garnish.

In a vehicle exterior structure according to another aspect of the present disclosure, the exterior body panel may be a roof panel and the window glass may be a rear window glass.

Improved appearance and suppressed noise can be achieved in cases including where the present disclosure is applied to a joint between the roof panel and the rear window glass.

Advantageous Effects of Invention

The present disclosure can provide a vehicle exterior structure which achieves improved appearance and suppressed noise.

BRIEF DESCRIPTION OF DRAWINGS

Embodiments of the present disclosure will be described by reference to the following figures, wherein.

DESCRIPTION OF EMBODIMENTS

Figure 1:
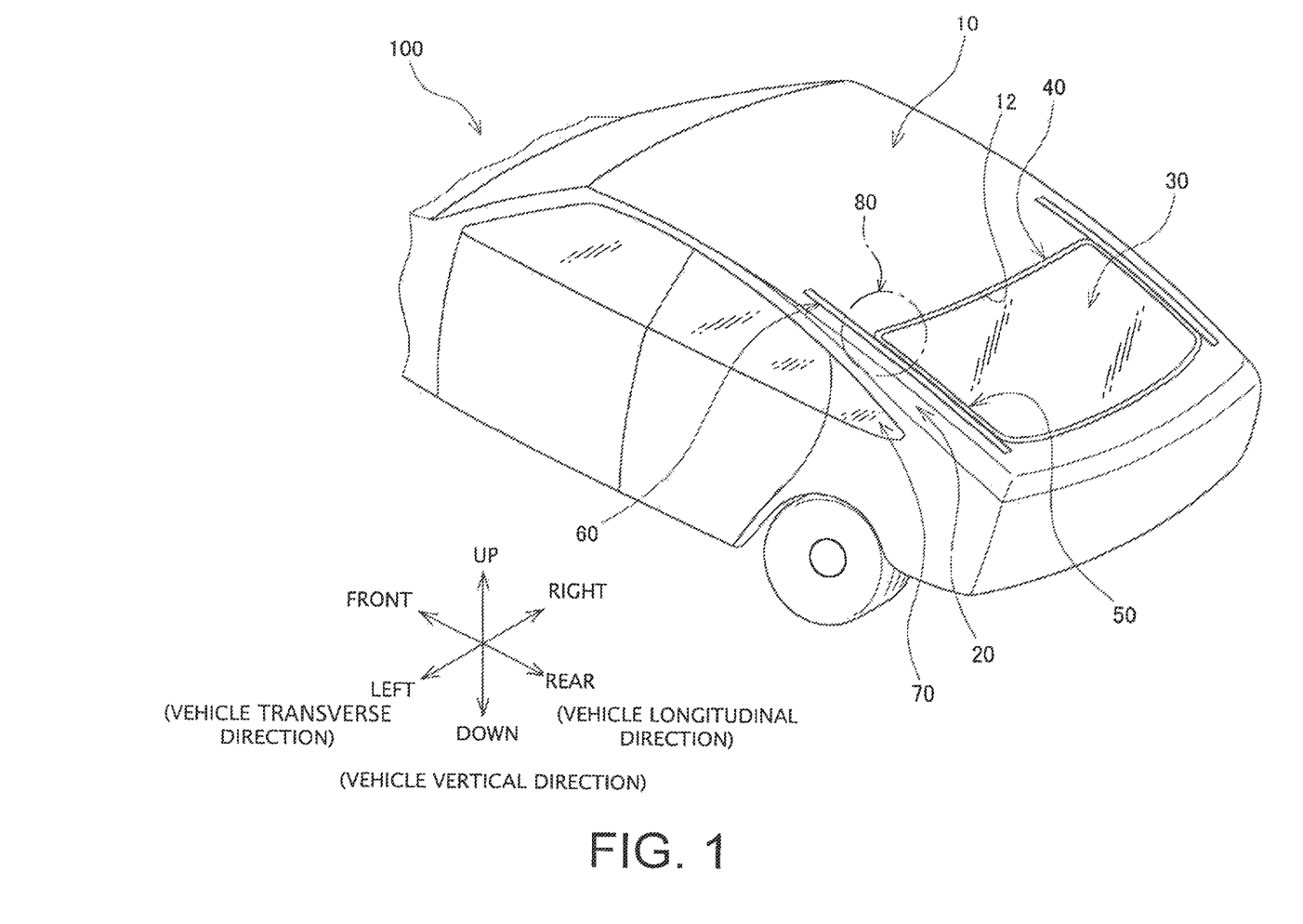
FIG. 1 is a perspective diagram, viewed from an upper rear position, of a vehicle to which a vehicle exterior structure according to an embodiment of the present disclosure is applied.

Vehicle exterior structures 80 according to embodiments of the present disclosure are described below with reference to the drawings. As shown in FIG. 1, a vehicle 100 having the vehicle exterior structure 80 includes, on a rear side, a roof panel 10, which is a vehicle exterior panel, a side outer panel 20, a rear window glass 30, a glass upper-edge molding 40, a glass side-edge molding 50, a garnish 60, and a quarter window glass 70. The rear window glass 30 is a plate window glass which is disposed next to the roof panel 10 on the rear side in a longitudinal direction of the vehicle. The glass upper-edge molding 40 is disposed along an upper edge 32 of the rear window glass 30, while the glass side-edge molding 50 is disposed along a side edge 33 of the rear window glass 30. The vehicle exterior structure 80 includes the roof panel 10, the rear window glass 30, the glass upper-edge molding 40, the glass side-edge molding 50, and the garnish 60.

The roof panel 10 is a metal plate formed as a roof of the vehicle 100. A side outer panel 20 is a metal plate formed to be connected at an outer side in the vehicle transverse direction. The rear window glass 30 is connected to the roof panel 10 via the glass upper-edge molding 40 and to the side outer panel 20 via the glass side-edge molding 50. The garnish 60 is disposed between the roof panel 10 and the side outer panel 20 and between the side outer panel 20 and the glass side-edge molding 50 such that the garnish 60 runs in the longitudinal direction and serves as a through member extending along the roof panel 10 and the rear window glass 30.

Figure 2:
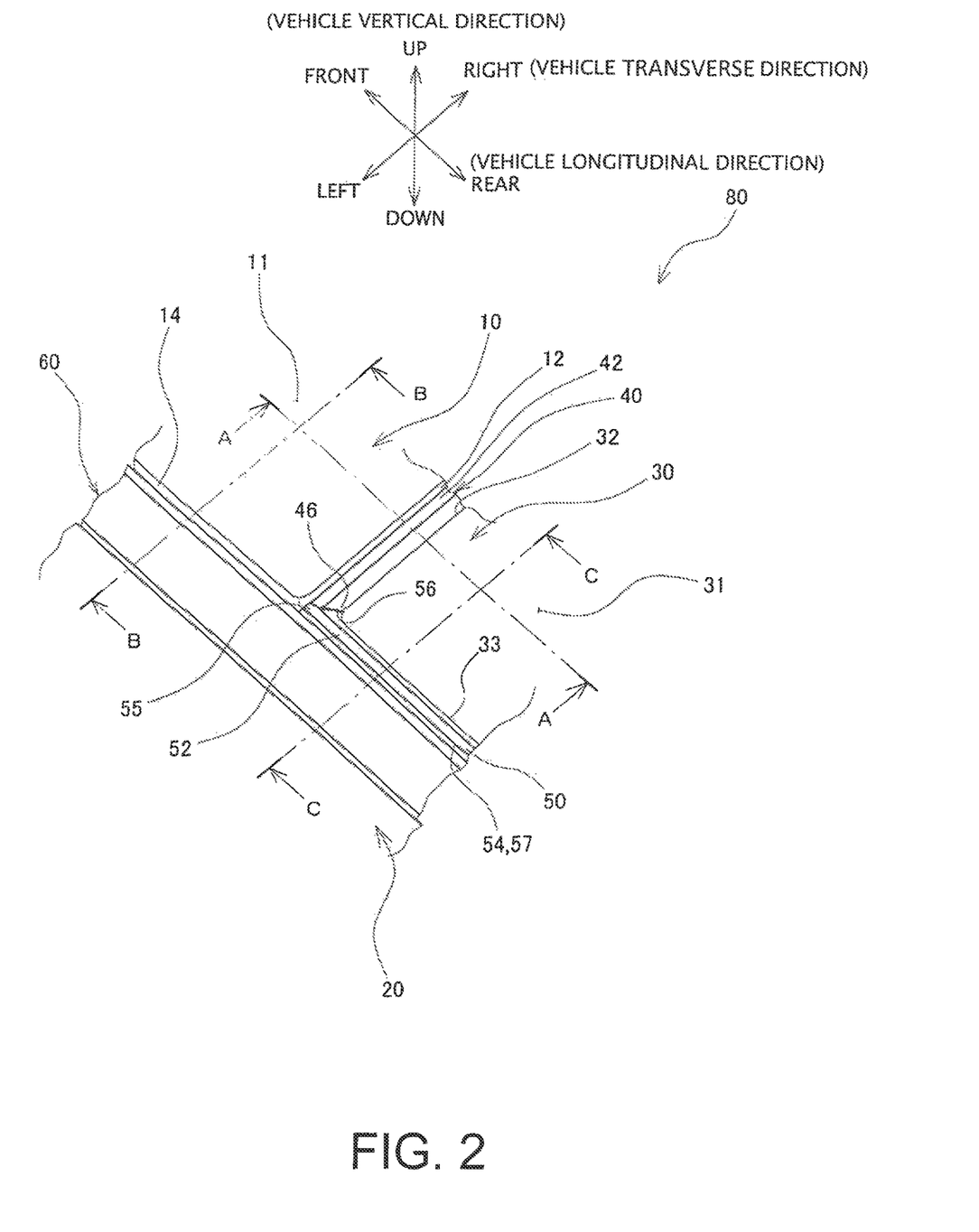
FIG. 2 is an enlarged perspective diagram of the vehicle exterior structure shown in FIG. 1.
Figure 3:
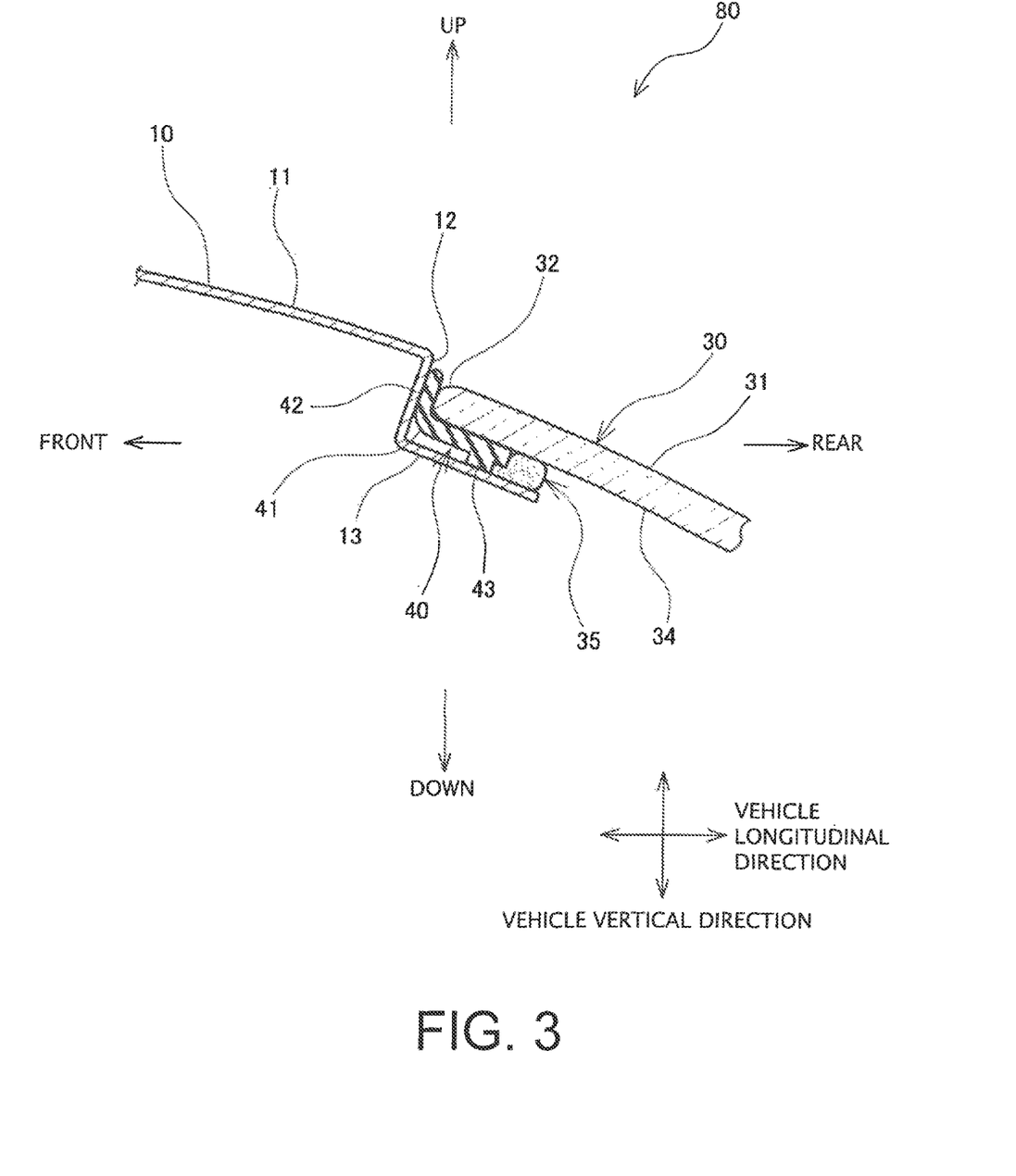
FIG. 3 is a cross-sectional view taken along the line A-A of FIG. 2.

With reference to FIGS. 2 and 3, a joint between the roof panel 10 and the rear window glass 30 is described. FIG. 3 is a cross-sectional view taken along the line A-A of FIG. 2. As shown in FIG. 3, an L-shaped receiving flange 13 which receives the rear window glass 30 is disposed at a rear surface 12 of a panel body 11 of the roof panel 10 which extends in the longitudinal direction of the vehicle. The glass upper-edge molding 40 of resin, rubber, or other material is attached to the receiving flange 13 on the upper side. The upper edge 32 of the rear window glass 30 with its peripheral portion is attached on the glass upper-edge molding 40. The rear surface 12 forms a surface of the roof panel 10 which faces the rear window glass 30.

As shown in FIG. 1, the glass upper-edge molding 40 is a band-shaped member extending along the rear surface 12 of the roof panel 10 in the vehicle transverse direction which intersects with the vehicle longitudinal direction. As shown in FIG. 3, the glass upper-edge molding 40 includes a body 41 extending in the vehicle transverse direction, an upper-edge lip 42 which protrudes, from the body 41, towards the rear surface 12 of the roof panel 10 and extends in the vehicle transverse direction, and a leg portion 43 which protrudes from the bottom surface of the body 41 towards the upper surface of the receiving flange 13 and extends in the vehicle transverse direction. A bottom surface 34 of the rear window glass 30 is attached on the upper surface of the body 41 with adhesive such as double-sided adhesive tape. A water stopper urethane belt 35 is disposed between the upper surface of the receiving flange 13 on the vehicle rear side of the leg portion 43 and the bottom surface 34 of the rear window glass 30. The upper-edge lip 42 abuts the rear surface 12 of the roof panel 10 to seal the joint with the rear surface 12 by being pressed against the rear surface 12. In this way, the entry of water can be suppressed.

Figure 4:
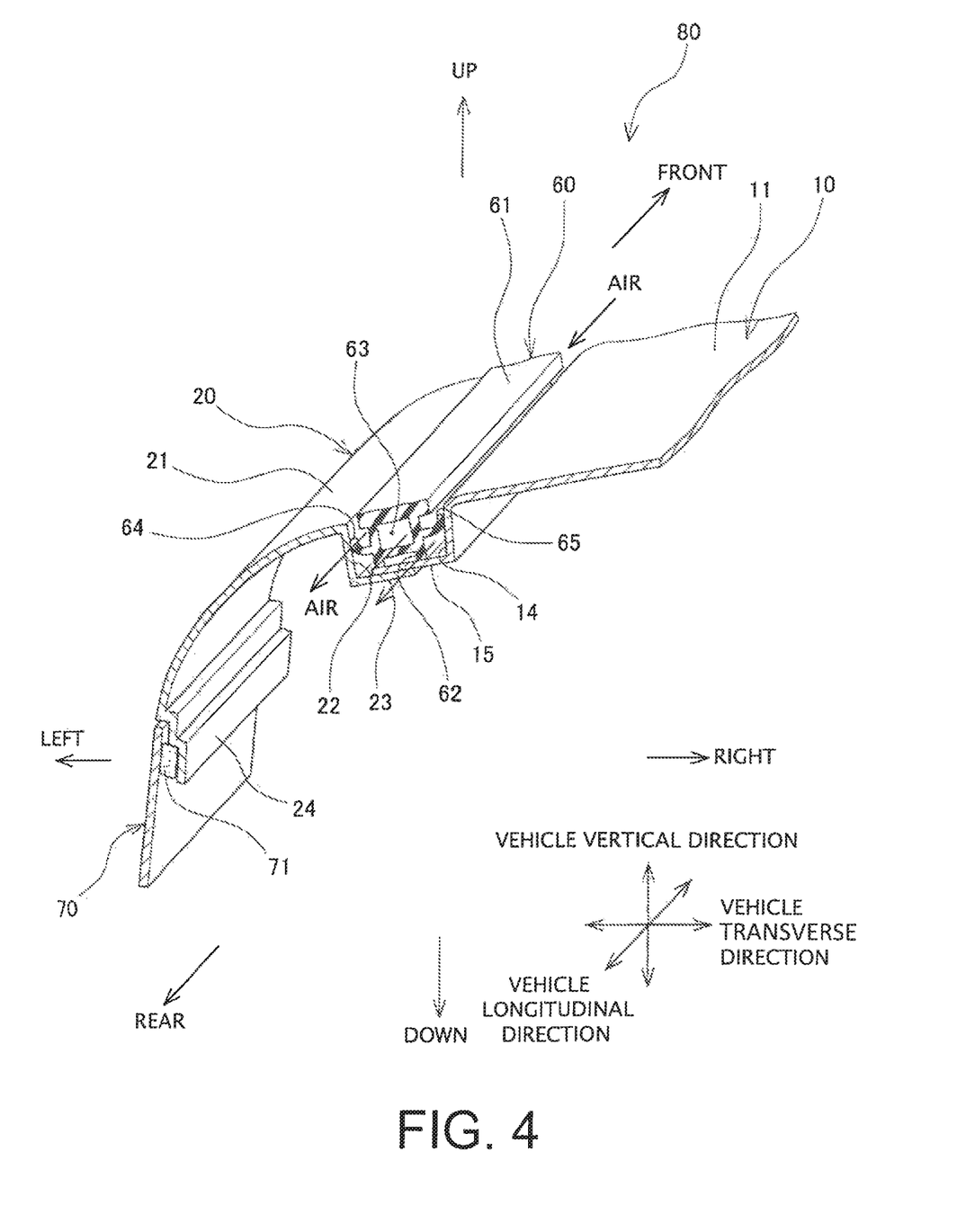
FIG. 4 is a cross-sectional view taken along the line B-B of FIG. 2.
Figure 5:
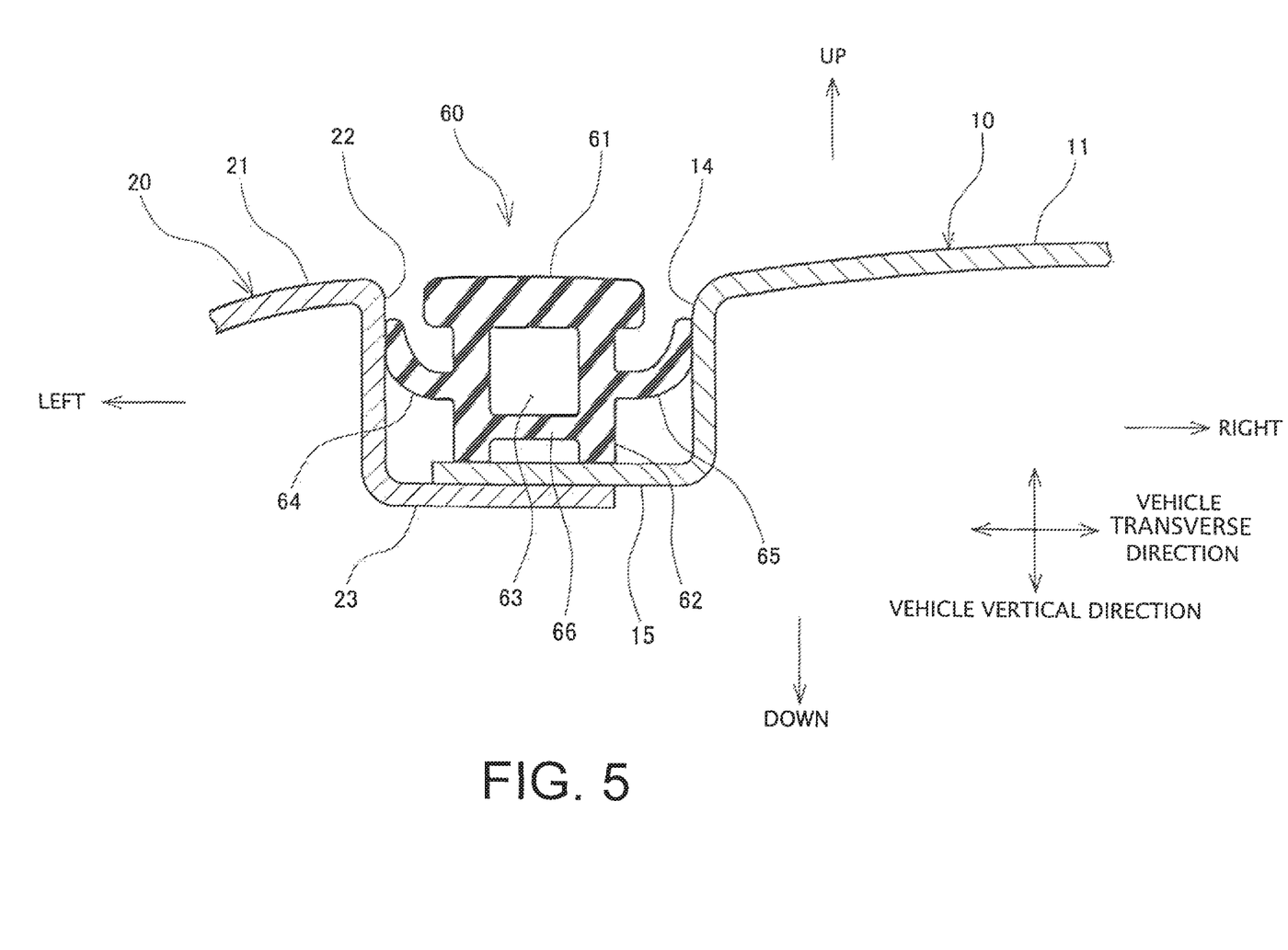
FIG. 5 is an enlarged cross-sectional view of FIG. 4.

With reference to FIGS. 2, 4, and 5, a joint between the roof panel 10 and the side outer panel 20 is described below. FIG. 4 is a cross-sectional view taken along the line B-B of FIG. 2, and FIG. 5 is an enlarged cross-sectional view around the garnish 60 shown in FIG. 4. As shown in FIG. 4, the roof panel 10 includes, at a side surface 14, an L-shaped connection flange 15 extending in the longitudinal direction of the vehicle. A panel body 21 of the side outer panel 20 includes, at a vehicle-center-side surface 22, an L-shaped connection flange 23 extending in the longitudinal direction of the vehicle. As shown in FIG. 5, the side surface 14 of the roof panel 10 and the vehicle-center-side surface 22 of the side outer panel 20 face each other. The connection flanges 15, 23 are overlapped and welded together such that the connection flange 15 is on the upper side in the vertical direction of the vehicle.

As shown in FIGS. 4 and 5, the garnish 60 is a band-shaped member which is a molded resin, rubber, or other material. The garnish 60 includes a top portion which is a part of the vehicle exterior design (hereinafter referred to as "design portion 61"), two leg portions 62 extending downward from the design portion 61, an outer lip 64 protruding from one of the leg portions 62 on the side outer panel 20 side towards the vehicle-center-side surface 22 of the side outer panel 20, and an inner lip 65 protruding from the other leg portion 62 on the roof panel 10 side towards the side surface 14 of the roof panel 10. The leg portions 62 are connected together via a lateral rib 66 to form a cavity 63 enclosed with the design portion 61, the two leg portions 62, and the lateral rib 66. The design portion 61, the leg portions 62, the outer lip 64, and the inner lip 65 all have a constant cross section extending in the longitudinal direction of the vehicle.

As shown in FIG. 5, the garnish 60 is fit from the top into a space between the side surface 14 and the vehicle-center-side surface 22 to seal the joint with the side outer panel 20 by the outer lip 64 in contact with the vehicle-center-side surface 22 and the joint with the roof panel 10 by the inner lip 65 in contact with the side surface 14. The bottom ends of the leg portions 62 are disposed in contact with the upper surface of the connection flange 15.

The outer side of the side outer panel 20 in the transverse direction of the vehicle curves downward and is connected to a rear side-surface of the vehicle 100. On the rear side-surface side, the side outer panel 20 includes a flange 24. The quarter window glass 70 is attached at a step portion of the flange 24 via a packing 71.

Figure 6:
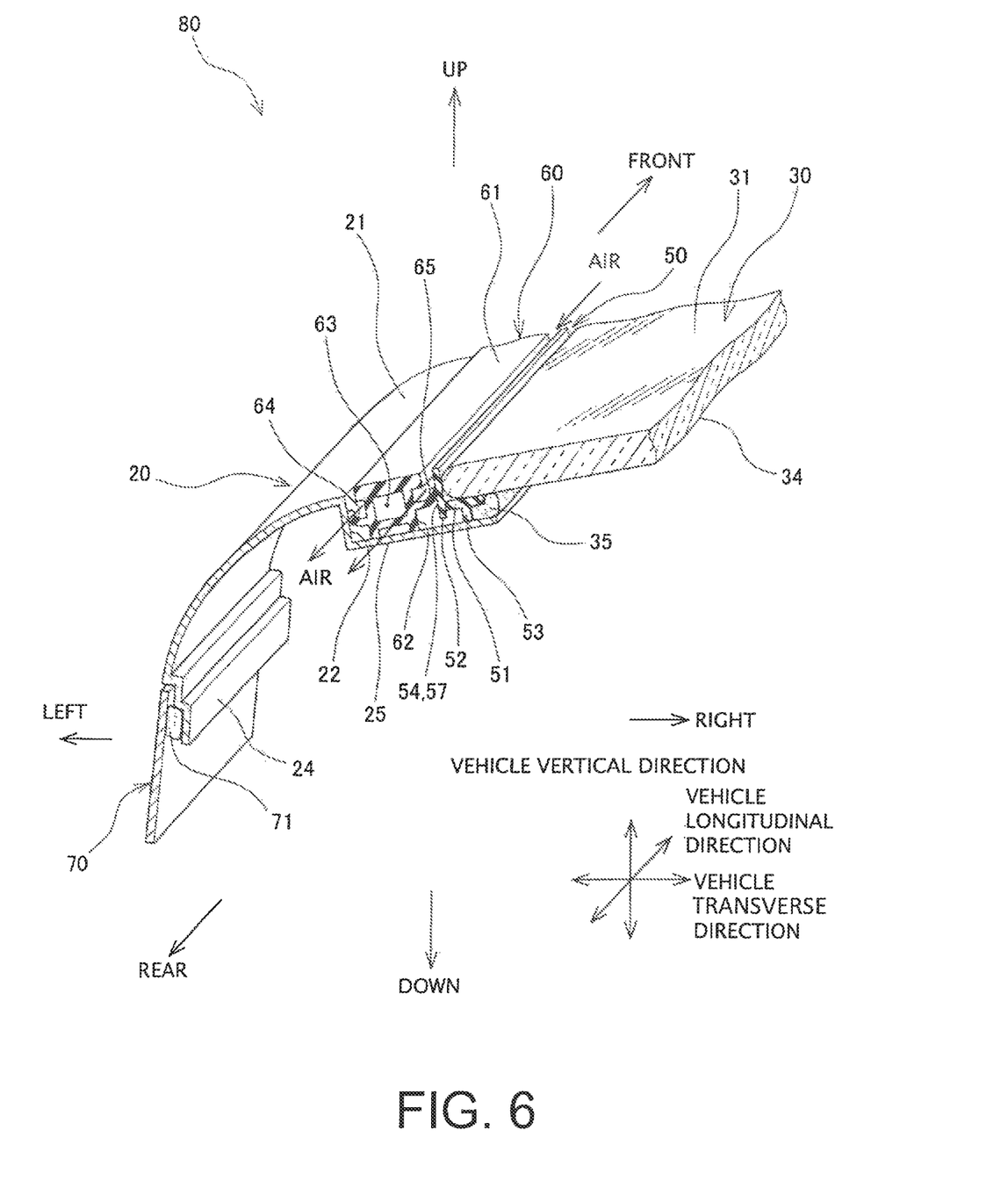
FIG. 6 is a cross-sectional view taken along the line C-C of FIG. 2.
Figure 7:
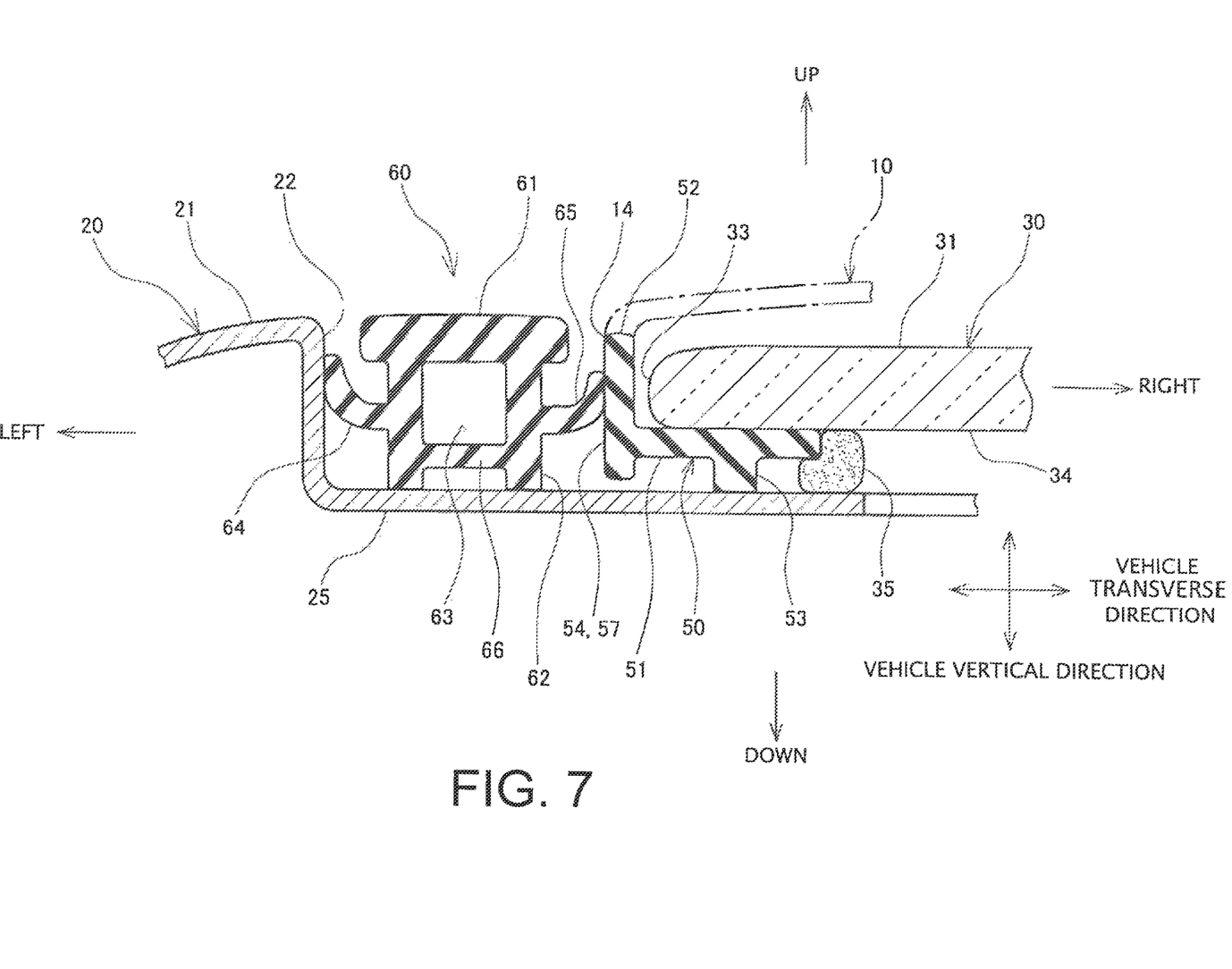
FIG. 7 is an enlarged cross-sectional view of FIG. 6.

With reference to FIGS. 2, 6, and 7, a joint between the side outer panel 20 and the rear window glass 30 is described below. FIG. 6 is a cross-sectional view taken along the line C-C of FIG. 2, and FIG. 7 is an enlarged cross-sectional view around the garnish 60 shown in FIG. 6.

As shown in FIG. 6, the panel body 21 of the side outer panel 20 includes, at the vehicle-center-side surface 22, an L-shaped receiving flange 25 which extends in the longitudinal direction of the vehicle and receives the rear window glass 30. The receiving flange 25 is formed continuously in the longitudinal direction of the vehicle with the connection flange 23 which is described above with reference to FIG. 5. The glass side-edge molding 50 of a resin, rubber, or other material is attached on the receiving flange 25 on the upper side. The side edge 33 of the rear window glass 30 with its peripheral portion is attached on the glass side-edge molding 50.

As shown in FIG. 6, the glass side-edge molding 50 is a band-shaped member extending along the side edge 33 of the rear window glass 30 in the longitudinal direction of the vehicle. As shown in FIG. 7, the glass side-edge molding 50 includes a body 51 extending in the longitudinal direction of the vehicle, a wall portion 52 which protrudes upward from an edge portion of the body 51 on the vehicle outer side in the vehicle transverse direction and extends in the longitudinal direction of the vehicle, and a leg portion 53 which protrudes downward from the body 51 and extends in the longitudinal direction of the vehicle. A wall surface 54 of the wall portion 52 on the outer side in the vehicle transverse direction is a side surface 57 of the glass side-edge molding 50. The wall surface 54 faces the vehicle-center-side surface 22 of the side outer panel 20. As shown in FIG. 7, the wall surface 54 is on the same plane as the side surface 14 of the roof panel 10 shown in FIGS. 4 and 5. As shown in FIG. 2, the wall portion 52 reaches the rear surface 12 of the roof panel 10 such that an end surface 55 of the wall portion 52 on the vehicle front side is in contact with the rear surface 12 of the roof panel 10. In this way, the wall surface 54 is in contact with the rear surface 12.

As shown in FIG. 2, an end portion 56 of the glass side-edge molding 50 on the vehicle front side is united to an end portion 46 of the glass upper-edge molding 40 on the outer side in the vehicle transverse direction around the corner of the rear window glass 30.

As shown in FIG. 7, the bottom surface 34 of the rear window glass 30 is attached on the upper surface of the body 51 of the glass side-edge molding 50 with adhesive such as double-sided adhesive tape. A water stopper urethane belt 35 is disposed between the upper surface of the receiving flange 25 on the inner side of the leg portion 53 in the vehicle transverse direction and the bottom surface 34 of the rear window glass 30.

Similarly as described above with reference to FIGS. 4 and 5, the garnish shown in FIG. 7 includes a design portion 61 extending in the longitudinal direction of the vehicle, leg portions 62, an outer lip 64, and an inner lip 65. The cross section of these elements is identical to the cross section described for the garnish described above with reference to FIGS. 4 and 5.

As shown in FIG. 7, the garnish 60 is fit from the top into a space between the vehicle-center-side surface 22 and the wall surface 54 to seal the joint to the side outer panel 20 by the outer lip 64 in contact with the vehicle-center-side surface 22 and the joint to the glass side-edge molding 50 by the inner lip 65 in contact with the wall surface 54 of the glass side-edge molding 50. The bottom ends of the leg portions 62 are disposed to be in contact with the upper surface of the receiving flange 25.

As described above, the garnish 60 is a through member having a constant cross section extending along the roof panel 10 and the rear window glass 30 in the longitudinal direction of the vehicle. The outer lip 64 accordingly runs in the longitudinal direction of the vehicle. In this way, no air disturbances along the outer lip 64 occur, because the air channel formed by the outer lip 64 and the vehicle-center-side surface 22 of the side outer panel 20 shown in FIGS. 4 to 7 has identical cross sections along the lines B-B and C-C of FIG. 2.

Because the wall surface 54 is on the same plane as the side surface 14 of the roof panel 10 shown in FIGS. 4 and 5, no step is formed between an air channel formed by the inner lip 65 and the side surface 14 of the roof panel 10 shown in FIGS. 4 and 5 and an air channel formed by the inner lip 65 and the wall surface 54 of the glass side-edge molding 50 shown in FIGS. 6 and 7. These air channels have identical cross sections along the lines B-B and C-C of FIG. 2. Further, no space exists between the side surface 14 of the roof panel 10 and the wall surface 54, because the end surface 55 of the wall surface 54 is in contact with the rear surface 12 of the roof panel 10. In this way, the air channel smoothly continues in the longitudinal direction of the vehicle, achieving no airflow disturbances along the inner lip 65. Noise can therefore be suppressed during driving of the vehicle 100.

Further, the garnish 60 is a through member having a constant cross section running along the roof panel 10 and the rear window glass 30 in the longitudinal direction of the vehicle. Because the design portion 61 includes no welding line of a conventional vehicle molding such as those described in JP 2004-136792 A, appearance can be improved, giving an impression of a smooth continuation in the longitudinal direction of the vehicle.

Figure 8:
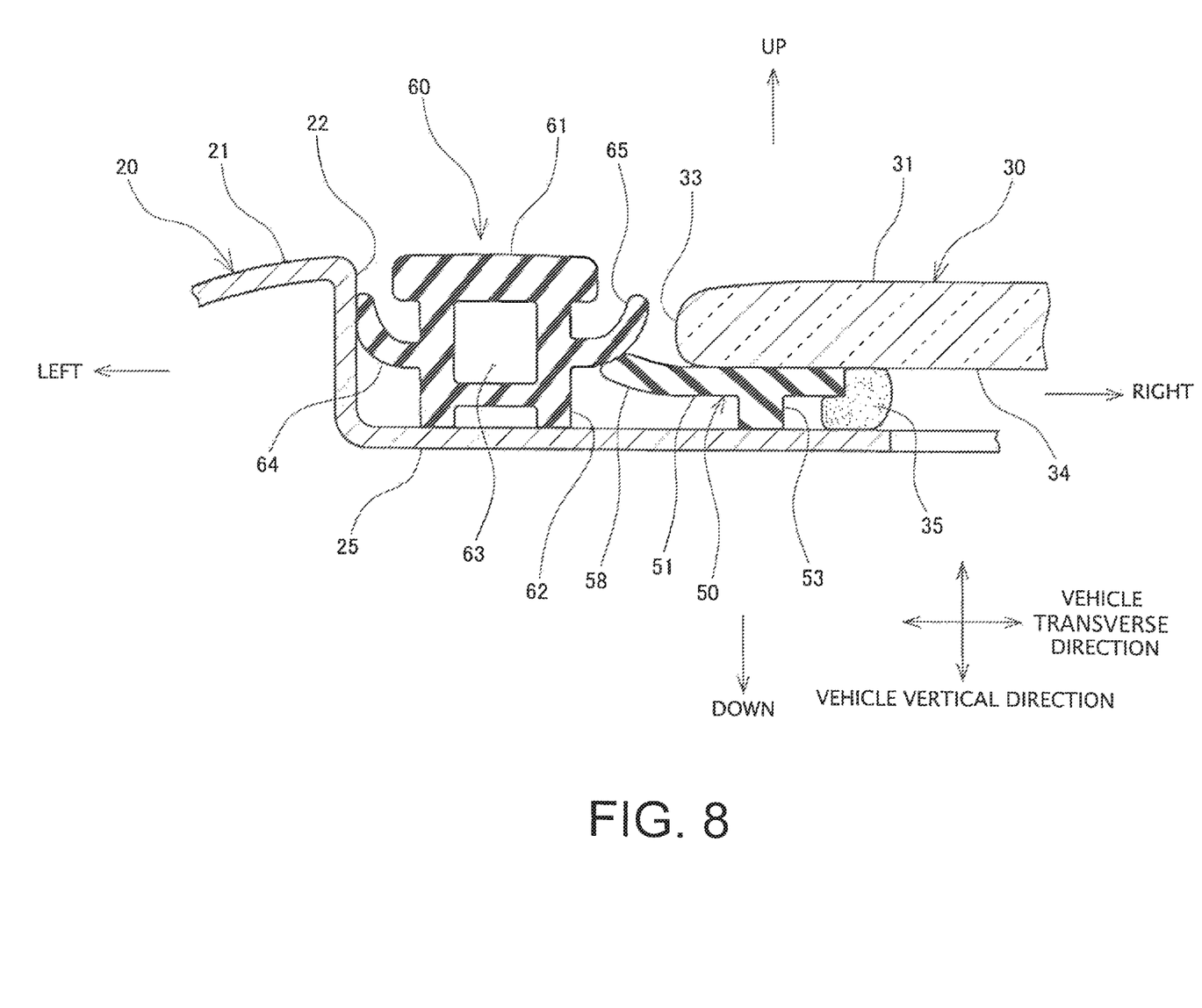
FIG. 8 is an explanatory diagram showing a cross-sectional view of a garnish and a glass molding of an example for comparison with embodiments of the present disclosure.

With reference to FIG. 8, a comparative example to the present disclosure is described. In the comparative example in FIG. 8, the shape of the cross section of the glass side-edge molding 50 is arranged to be identical to the shape of the cross section of the glass upper-edge molding 40. As shown in FIG. 8, the glass side-edge molding 50 includes a body 51 which extends in the longitudinal direction of the vehicle, and a side edge lip 58 which protrudes from the body 51 towards the outer side in the vehicle transverse direction. In this way, because the side edge lip 58 of the glass side-edge molding 50 and the inner lip 65 of the garnish 60 obstruct each other, the joint between the garnish 60 and the glass side-edge molding 50 cannot be effectively sealed.

In contrast, in the vehicle exterior structure 80 according to an embodiment of the present disclosure, the joint between the garnish 60 and the glass side-edge molding 50 can be effectively sealed while avoiding overlap between the side edge lip 58 of the glass side-edge molding 50 and the inner lip 65 of the garnish 60, because no side edge lip 58 as disclosed in the comparative example shown in FIG. 8 is provided. The sealing between the garnish 60 and the glass side-edge molding 50 is achieved by providing the glass side-edge molding 50 having the wall surface 54 with which the inner lip 65 of the garnish 60 is in contact. Further, the rear window glass 30 can be preferably sealed around the circumference, because the end portion 46 of the glass upper-edge molding 40 and the end portion 56 of the glass side-edge molding 50 are unitedly welded around a corner of the rear window glass 30.

The invention claimed is:

1. A vehicle exterior structure comprising:
   an exterior body panel;
   a plate window glass disposed next to the exterior body panel;
   a glass side-edge molding disposed along a side edge of the window glass up to the exterior body panel in a direction in which the exterior body panel and the window glass are aligned; and
   a garnish disposed to face a side surface of the exterior body panel and a side surface of the glass side-edge molding, the garnish having a constant cross section running in the direction in which the exterior body panel and the window glass are aligned;
   wherein the side surface of the glass side-edge molding is a wall surface which faces the garnish, and the garnish comprises a lip in contact with the side surface of the exterior body panel and the wall surface of the glass side-edge molding.

2. The vehicle exterior structure according to claim 1, wherein an end surface of the wall surface of the glass side-edge molding in the direction in which the exterior body panel and the window glass are aligned is in contact with a surface of the exterior body panel which faces the window glass, and the wall surface is on the same plane as the side surface of the exterior body panel.

3. The vehicle exterior structure according to claim 1, wherein a glass upper-edge molding is disposed along an upper edge of the window glass which faces the exterior body panel, the glass upper-edge molding extends in a direction intersecting with the direction in which the exterior body panel and the window glass are aligned, the glass upper-edge molding comprises an upper-edge lip which abuts a facing surface of the exterior body panel, and an end portion of the glass upper-edge molding is welded with an end portion of the glass side-edge molding.

4. The vehicle exterior structure according to claim 2, wherein a glass upper-edge molding is disposed along an upper edge of the window glass, which faces the exterior body panel, the glass upper-edge molding extends in a direction intersecting with the direction in which the exterior body panel and the window glass are aligned, the glass upper-edge molding comprises an upper-edge lip which abuts a facing surface of the exterior body panel, and an end portion of the glass upper-edge molding is welded with an end portion of the glass side-edge molding.

5. The vehicle exterior structure according to claim 1, wherein the exterior body panel is a roof panel, and the window glass is a rear window glass.

6. The vehicle exterior structure according to claim 2, wherein the exterior body panel is a roof panel, and the window glass is a rear window glass.

7. The vehicle exterior structure according to claim 3, wherein the exterior body panel is a roof panel, and the window glass is a rear window glass.

8. The vehicle exterior structure according to claim 4, wherein the exterior body panel is a roof panel, and the window glass is a rear window glass.

* * * * *